United States Patent [19]

Boyajian

[11] 4,249,308
[45] Feb. 10, 1981

[54] BOLT CUTTER
[76] Inventor: Alfred Z. Boyajian, P.O. Box 811, Manhattan Beach, Calif. 90268
[21] Appl. No.: 68,083
[22] Filed: Aug. 20, 1979
[51] Int. Cl.³ ............................................. B26B 13/00
[52] U.S. Cl. ........................................ 30/231; 30/250; 30/260; 83/602; 83/607
[58] Field of Search ........................... 30/231, 250–252, 30/260, 279, 329, 349, 353; 83/602, 605, 607; 10/25

[56] References Cited
U.S. PATENT DOCUMENTS

| 821,183 | 5/1906 | Nettleton | 30/349 |
| 1,005,661 | 10/1911 | Shirt | 30/260 |
| 1,497,676 | 6/1924 | Fink | 83/607 |
| 2,385,835 | 10/1945 | Neal | 30/250 |

Primary Examiner—Frank T. Yost
Attorney, Agent, or Firm—Robert T. Gammons

[57] ABSTRACT

A bolt cutter wherein there are removably replaceable cutter blades supported in cutting relation by pivotally connected jaws and wherein the jaws are structured to transmit the force couple for cutting to the blades at opposite ends and at opposite sides. Pivotal movement of the jaws relative to each other is effected by a cam roll and cam groove interengaged by the lever handles connected to the jaws. The cam groove is structured to enable changing its contour to thereby change the mechanical advantage.

14 Claims, 12 Drawing Figures

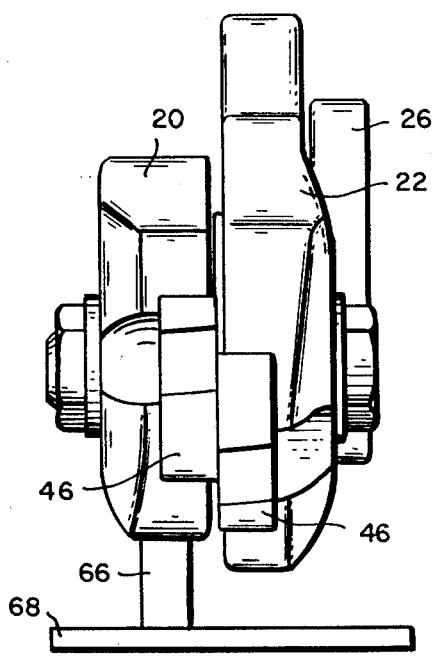
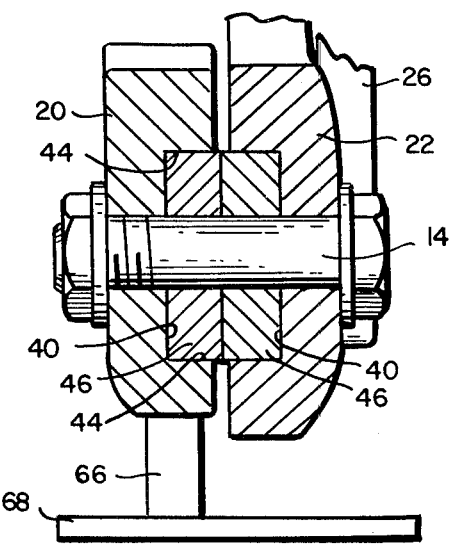
FIG.6　　　　　FIG.7
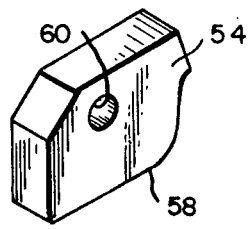
FIG.9
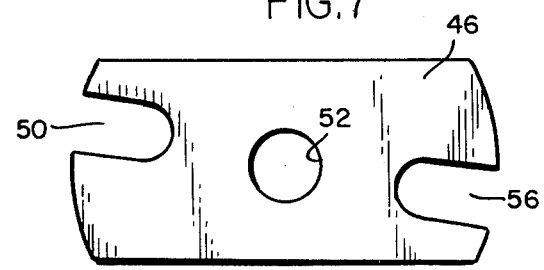
FIG.10
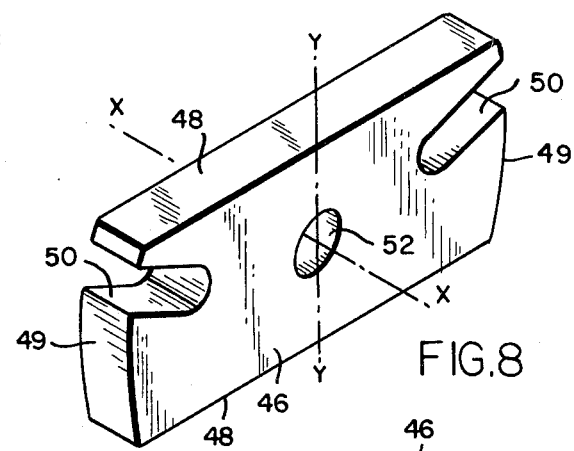
FIG.8
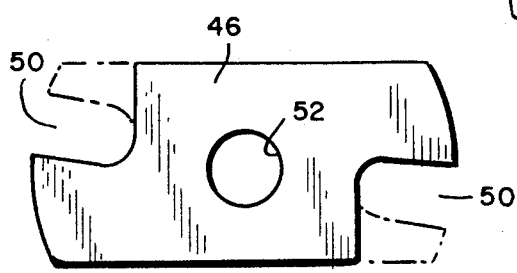
FIG.11
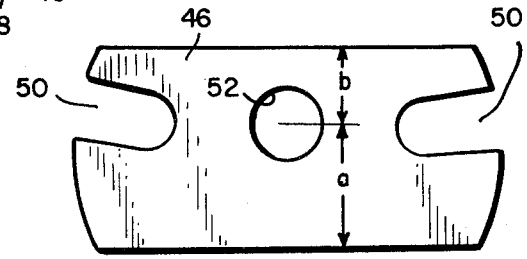
FIG.12

BOLT CUTTER

BACKGROUND OF INVENTION

The bolt cutter of this invention comprises an improvement on the bolt cutters disclosed in my U.S. Pat. No. 4,058,893 wherein there are pivotally-mounted jaws containing cutting edges which are moved arcuately relative to each other by means of handles and an interengaged cam and groove which provides a mechanical advantage for applying a shearing force to effect cutting. The bolt cutter of this invention is structured to provide an improvement over the patented bolt structure of removably replaceable cutter blades in association with the cutter jaws, thereby to improve the utility of the bolt cutter, an adjustably variable cam and groove for changing the mechanical advantage provided for pivoting jaws relative to each other and a stand. Removably replaceable blades per se are not new in cutting instrumentalities, such removable blades being shown in my U.S. Pat. No. 3,971,131. The improvement in this application resides in so structuring the jaws that the force couples are applied to the blades at opposite ends and opposite sides are approximately equal.

SUMMARY OF INVENTION

A bolt cutter comprising jaws, means pivotally connecting the jaws, and handles connected to the jaws for effecting pivotal movement, the jaws having confronting planar surfaces normal to the pivot axis about which they pivot, said planar surfaces containing blade-receiving recesses open at the distal ends of the jaws, said recesses defining spaced, parallel, force-transmitting shoulders situated at equal radial distances from said pivot axis and blades dimensioned to be snugly received in the recesses between the force-transmitting elements in surface-to-surface engagement for pivotal movement about said pivot axis with the jaws, said blades having notched ends defining cutting edges arranged to be moved in opposite arcuate directions about said pivot axis relative to each other to effect cutting and wherein the force couple developed by the pivotal movement of the jaws is transmitted to the opposite ends and opposite sides of the blades in substantially equal amounts. The blades have notches at both ends so as to be reversible as well as replaceable. The notches may be symmetrical with respect to an axis perpendicular to the plane of the blade or an axis perpendicular to the edge of the blade passing through the pivot axis. There is means pivotally connecting one of the handles to the other for pivotal movement about an axis spaced from and parallel to the pivot axis of the blades and cam means operably connecting one of the handles and the jaw associated therewith, the cam means comprising an cam roll mounted to the lever handle in engagement with a cam surface for rotation about said pivot and means associated with the cam surface for modifying the contour thereof to change the mechanical advantage afforded by interengagement of the cam roll with the cam surface. The means for modifying the contour of the cam surface comprises a part recessed into the cam surface defining a surface portion of the cam surface which is removably replaceable by an insert providing a surface of different contour.

The invention will now be described in greater detail with reference to the accompanying drawings, wherein:

FIG. 6 is an end elevation;

FIG. 7 is a transverse section of the jaws taken on the pivot axis of the jaws;

FIG. 8 is a perspective view of a single cutting blade, both blades being identical;

FIG. 9 is a perspective view of the cam insert;

FIG. 10 is a plan view of a single blade wherein the notches are symmetrical with respect to an axis perpendicular to the plane of the blade passing through the center of the blade;

FIG. 11 is a plan view of a single blade like that shown in FIG. 8 with the portions of the blade opposite the cutting edges removed; and FIG. 12 is a plan view of a single blade wherein the distance between the center of the blade and the edge of the blade at the cutting side is greater than that at the opposite side.

Figure 1:
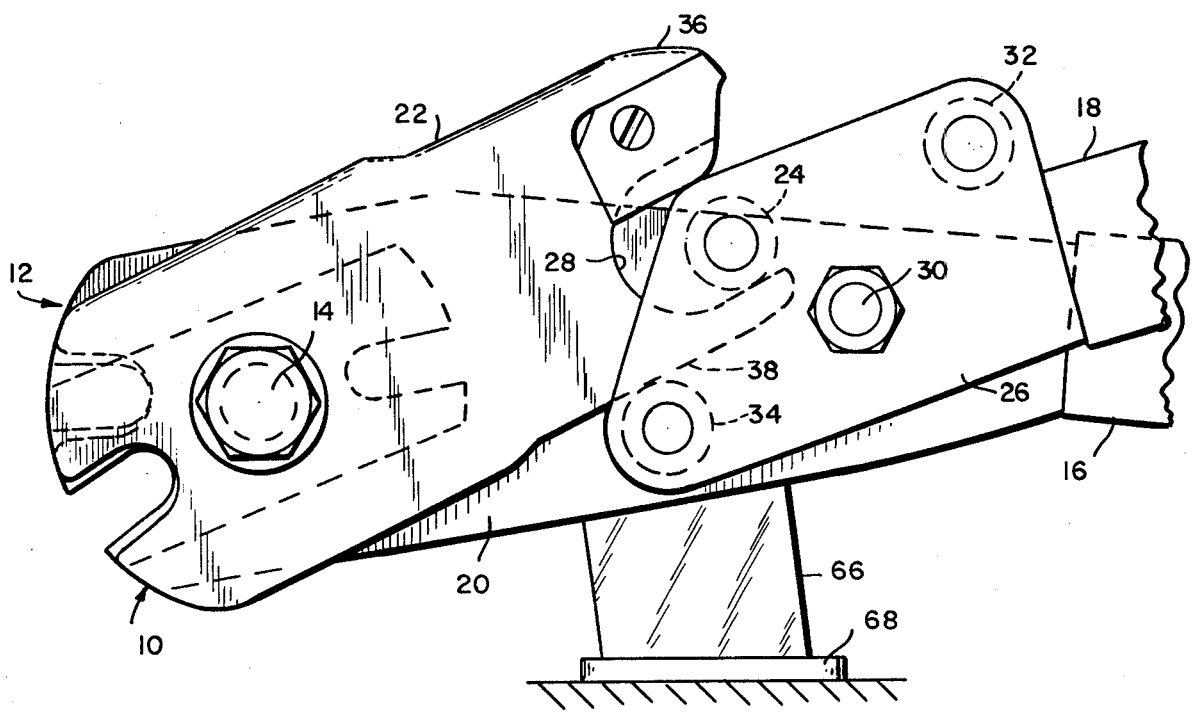
FIG. 1 is a fragmentary elevation of the bolt cutter of the invention resting on a supporting surface with the jaws displaced.
Figure 2:
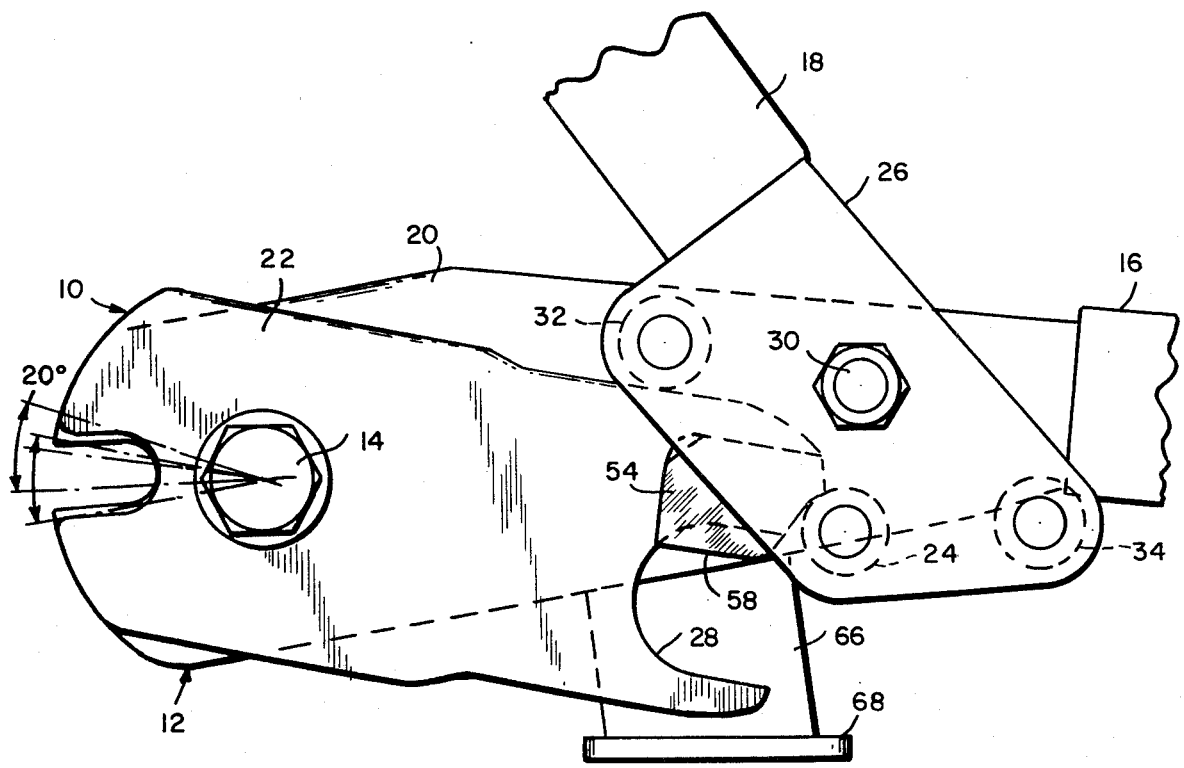
FIG. 2 is a view like FIG. 1 with the jaws aligned to receive a part to be cut.
Figure 3:
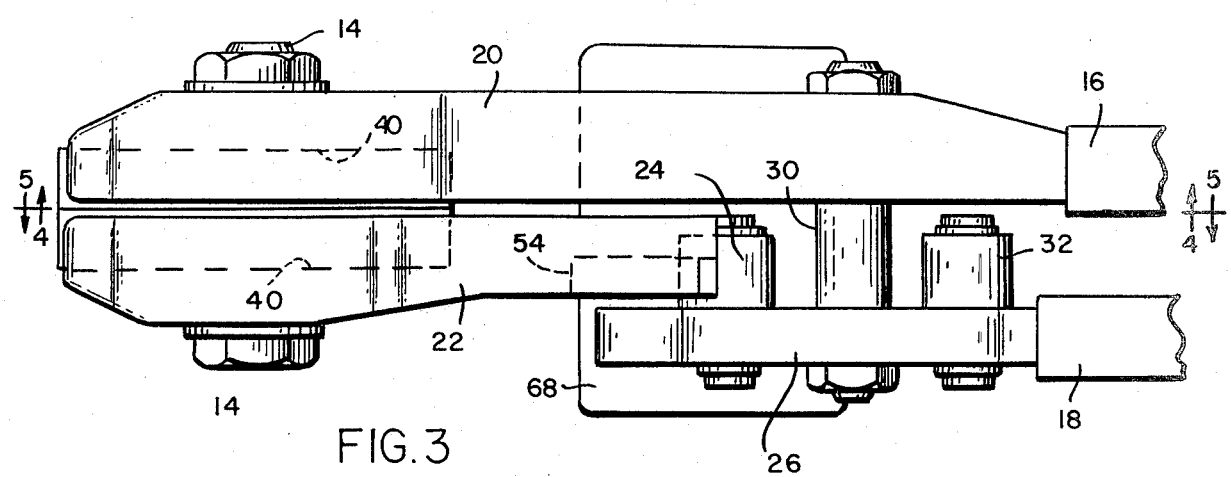
FIG. 3 is a plan view of FIG. 1.

Referring to the drawings, FIGS. 1 to 3 inclusive, the bolt cutter comprises jaws 10 and 12 pivotally connected in shearing relation to each other by means of a bolt 14, the axis of which is perpendicular to the faces of the jaws, and lever handles 16 and 18 by means of which the jaws are pivoted relative to each other.

The jaw 12 is provided at the distal end of a rigid bar 20 to the opposite end of which is rigidly connected the lever handle 16. The jaw 10 is provided at the distal end of a rigid bar 22 and is operatively connected to the lever arm 18 by a cam roll 24 mounted to the handle 18 on an extension 26 of the handle 18 and a cam groove 28 at the distal end of the rigid bar 22 with which it is engaged. The extension 26 of the lever arm 18 is pivotally connected to the rigid bar 20 adjacent its junction with the handle 16 by a bolt 30, the axis of which is perpendicular to the bars 20 and 33 and parallel to the axis of the bolt 14. The extension 26 has mounted to it a roller 32 and a roller 34 for rotation about axes parallel to the axes of the bolts 14 and 30 and these rollers at times have rolling contact with cam surfaces 36 and 38, respectively. All of the aforesaid structure is disclosed in my U.S. Pat. No. 4,058,893 to which reference may be had for a more detailed description of the operation of the bolt cutter.

Figure 4:
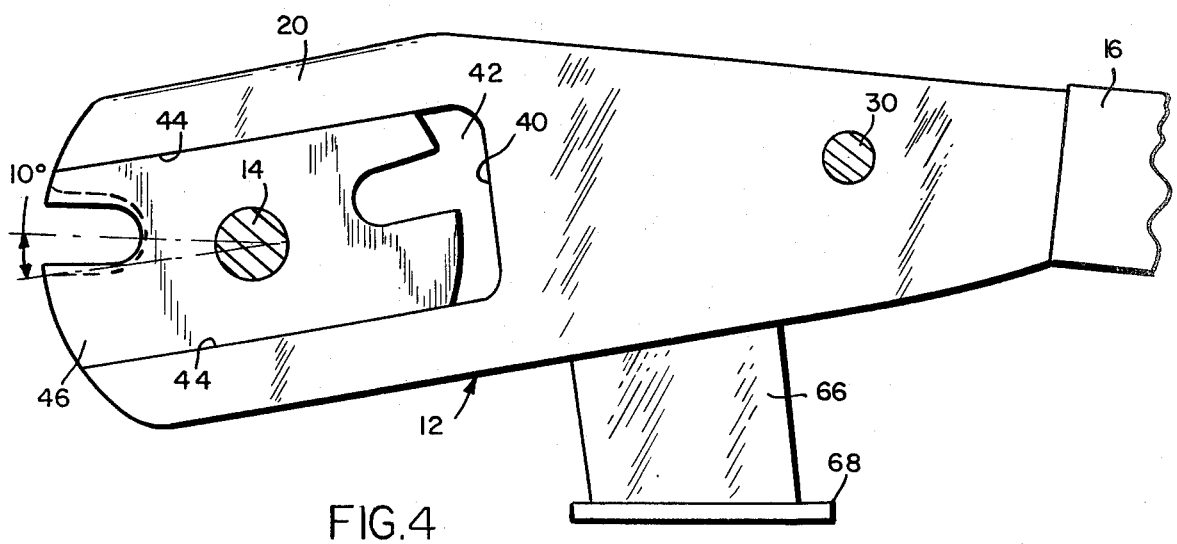
FIG. 4 is an elevation of the inner side of one of the jaws taken on the line 4—4 of FIG. 3.
Figure 5:
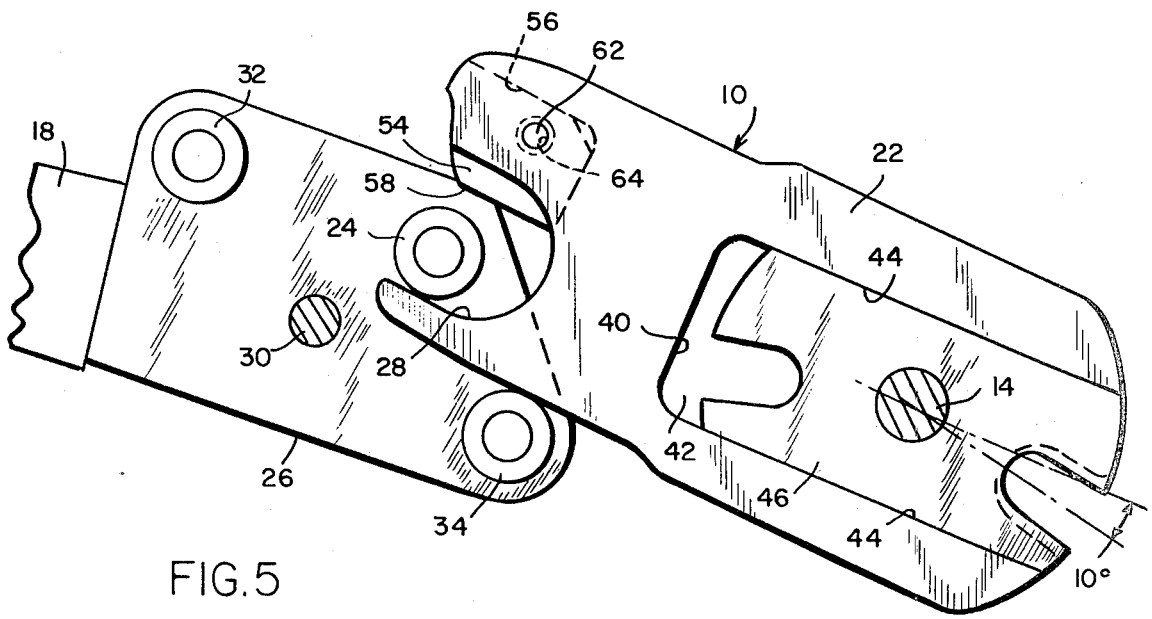
FIG. 5 is an elevation of the inner side of the other of the jaws taken on a line 5—5 of FIG. 3.

In the aforesaid patent, the jaw which provides the cutting edges are integral portions of the cutting blades. In contrast, the improved bolt cutter of this invention is provided with removably reversible cutting blades structured to enable receiving very high loads without destruction. Referring to FIGS. 4 and 5, each of the bars 20 and 22 is provided at its inner side with a recess pocket 40 having a flat bottom surface 42 and spaced, parallel sides 44-44 which may be at equal radial distances from the axis of the bolt 14. The cutting blades which are rotated face to face relative to each other in shearing relation to effect cutting are comprised of rigid blocks 46, FIG. 8, having flat, spaced, parallel top and bottom edges 48-48, curved ends 49—49 containing slots 50—50 for receiving the part to be cut, and holes 52, the axis of which may be equidistant from the parallel sides 48—48 and the curved ends 49—49. The blocks are of a transverse thickness such as to be tightly received within the recesses 40 between the sides 44—44 of the recesses 40 with their exposed surfaces projecting slightly from the inner sides of the bars as shown in FIG. 7 so as to have interfacial contact in a plane perpendicular to the axis of the bolt 14 thus to reduce the bending movement on the bolt 14 and to concentrate the shearing at the interfaces. The blocks 46 are of such a length that, when disposed in the recesses, one of the curved ends 49 coincides substantially with the curved end of the bar within which it is mounted and the opposite curved end is spaced from the closed end of the recess. As illustrated in FIG. 2, when the jaws are positioned to receive a part to be cut, the slots 50—50 are substantially in alignment.

As thus constructed, when the jaws are pivoted relative to each other by, for example, swinging the handle 18 in a clockwise direction about the axis of its pivot bolt 30, FIG. 2, the bar 22 is rotated about the axis of the bolt 14 relative to the bar 20 so as to apply a cutting force to the shearing blades 46—46 and, because of the structural configuration of the recesses within which the blades are seated, provide load-transmitting surfaces which may be approximately symmetrical with respect to the axis of the bolt 14 so that the shearing forces are taken by the bolt. This is especially important since the bolt cutter of this invention is designed to apply high shearing loads and unless the cutter blades are substantially symmetrically constrained, the notches 50—50 at the ends of the blades which are an incident for development of cracks will cause cracking and failure of the blades. The mounting of the cutting blades eliminates such cracking, thereby prolonging the life of the bolt cutter and, in fact, providing the structure necessary to its utility since, unless so supported, the blades quickly fail and if not replaceable requires that the entire bolt cutter be discarded for a new one. Desirably, the cutter blades are double-ended so that they may be reversed to substitute an end which has become somewhat dull for an end which is still sharp. The cutting blades are comprised of tool steel; however, the jaws may be made of an aluminum alloy and the handle of soft steel which is much less expensive and much lighter and provides the same cutting ability.

The blade shown in FIG. 8 has end slots 50—50 which are symmetrical with respect to an axis y—y perpendicular to an edge of the blade passing through the center of the bolt hole so that to reverse the blade, the blade must be turned over. Optionally, the notches 50—50 may be symmetrical with respect to an axis x—x perpendicular to the plane of the blades when passing through the center of the bolt hole. With this construction, the blade is reversed by turning it end for end. In the latter form as shown in FIG. 11 the dotted portions of the blades opposite the cutting edges may be removed. Because the jaws into which the blades are recessed are not inflexibly rigid, it may be desirable to strengthen the cutting sides of the blades by increasing the widths of the blades at the cutting sides as shown in FIG. 12 wherein the distance a between the center and the edge at the cutting side is greater than the distance b at the other side. Desirably, the center lines of the notches pass through the center and are inclined at an angle of 10° to the opposite parallel edges of the blades which is half the starting angle of the two jaws which permits making the blades identical.

In the aforesaid patented structure, and as described briefly above, the pivotal movement of the jaws is effected by interengagement of a cam roller 24 with a cam groove 28 at the distal end of the bar 22. In accordance with another improvement of the tool herein illustrated, there is provided a removably replaceable cam element 54 which is fixed within a recess 56 in the bar 22 at the outer side thereof and this cam element has a cam surface 58 arranged to become a surface portion of the groove 28 and thus to control the mechanical advantage achieved by interengagement of the cam roll 24 with the groove 28. By providing cam elements 54 with cam surfaces 58 of different contour, the mechanical advantage of the tool may be easily changed for a particular purpose. The cam element 54 contains a hole 60 and is fastened in place by a screw 62 which is inserted through the hole 60 and screwed into a threaded hole 64 in the bar 22.

In accordance with another improved feature of the invention, a leg 66 is fixed to the lower side of the bar 20 and has at its lower end a foot plate 68 so that, in conjunction, the leg and foot 66 and 68 provide means for supporting the tool in an upright position for ease in use. When the tool is placed on the ground or other supporting surface as shown in FIG. 1, the weight of the handle lever 16 rotates the bar 20 in a clockwise direction about the axis of the bolt 30 to the position shown in dotted lines in FIG. 1. To use the tool, the distal end of the lever handle 16 is held down, for example, by stepping upon it and the lever handle 18 is lifted upwardly in a counterclockwise direction about the pivot axis of the bolt 30 to bring the jaws into registering alignment, as shown in FIG. 2, for receiving the part to be cut and thus enable using the other hand to place the part to be cut in the jaws for cutting.

From the foregoing, it is evident that the bolt cutting tool of this invention has three important advantages. First, it has removably replaceable cutting blades which are so structured as to resist destruction under the highest loads which can be applied without destruction of the entire tool, second, the mechanical advantage afforded can be changed by the simple expedient of removal and replacement of a cam element and, third, that the manipulation of the tool is improved immeasurably by the fact that is provided with a support so that it can be operated with one hand, freeing the other hand for placing the part to be cut into cutting position.

It should be understood that the present disclosure is for the purpose of illustration only and includes all modifications or improvements which fall within the scope of the appended claims.

I claim:

1. A shearing device comprising jaws, means pivotally connecting the jaws, handles connected to the jaws for effecting pivotal movement, said jaws having confronting planar surfaces normal to the pivot axis about which they pivot, said planar surfaces containing blade-receiving recesses open at the distal ends of the jaws, said recesses defining spaced, parallel, force-transmitting elements spaced from said pivot axis and blades dimensioned to be snugly received in the recesses between the force-transmitting elements in surface engagement for pivotal movement about said pivot axis with the jaws, said blades having notched ends defining cutting edges arranged to be moved in opposite arcuate directions about said pivot axis relative to each other to effect cutting and wherein the force couple developed by pivotal movement of the jaws is transmitted to the opposite ends and opposite sides of the blade.

2. A device according to claim 1 wherein the blades have notches at both ends so as to be reversible as well as replaceable.

3. A device according to claim 1 wherein there is means pivotally connecting one of the handles to the other for pivotal movement about an axis spaced from and parallel to the pivot axis of the blades, cam means connecting one of the handles to the jaw with which it is associated, said cam means comprising a cam roller mounted to the handle for rotation about an axis parallel to said pivot axis interengaged with the cam surface and means for modifying the contour of the cam surface to change the mechanical advantage afforded by engagement of the cam roller with the cam surface.

4. A device according to claim 1 wherein there is means pivotally connecting the handles for pivotal movement about an axis spaced from and parallel to the pivot axis of the jaws and the handles of the associated jaws are mechanically coupled so that movement of said handles relative to each other effect pivotal movement of the jaws and wherein the mechanical coupling of the one of the handles and is associated jaw comprising a cam roll pivotally mounted to the handle for rotation about an axis parallel to said pivot axis and a cam surface at the distal end of the jaw associated therewith.

5. A device according to claim 1 comprising means pivotally connecting the handles, a cam roll and cam groove connecting one of the handles to its associated jaw, said cam groove containing a recess for receiving an insert, and said insert providing for changing the contour of the groove to, in turn change the mechanical advantage achieved by moving the cam roll along said groove.

6. A device according to claim 1 comprising a supporting leg and foot secured to the lower side of one of the cutting jaws for supporting the bolt cutter in a horizontal position for use.

7. A shearing device according to claim 1 wherein the notches are symmetrical with respect to an axis perpendicular to the plane of the blade and passing through the center thereof.

8. A shearing device according to claim 1 wherein the notches are symmetrical with respect to an axis perpendicular to an edge of the blade passing through the center thereof.

9. A shearing device according to claim 1 wherein the portion of the blades opposite the cutting edges are removed.

10. A shearing device according to claim 1 wherein the cutting edges are inclined at an angle of 10° to their opposite longitudinal edges which is half the starting angle of the two jaws.

11. A shearing device according to claim 1 wherein the cutting edges of the two opposed blades are inclined in opposite directions at angles of 10° to their opposite longitudinal edges.

12. A shearing device according to claim 1 wherein the distance from the center of the blade to the cutting edge at the cutting side is greater than the distance from the center to the edge at the opposite side.

13. A shearing device according to claim 1 wherein the blades protrude from the recesses so that the confronting faces have shearing engagment in a plane spaced from and parallel to the confronting faces of the respective jaws.

14. A device wherein there are pivotally connected jaws having confronting planar surfaces containing blade-receiving recesses open at the ends of the jaws, said recesses defining spaced, parallel, load-transmitting elements situated at opposite sides of the pivot axis, replaceable blades dimensioned to be received in said recesses in surface engagement for pivotal movement about said pivot axis, said blades having spaced, parallel edges paralleling and in engagement with the load-transmitting elements and said blades having notched ends defining cutting edges arranged to be moved in opposite arcuate directions relative to each other to effect cutting, and means for effecting pivotal movement of the jaws to, in turn, effect pivotal movement of the blades and wherein the pivotal movement of the blades is transmitted to the jaws by said load-transmitting elements at opposite sides and ends of the blades.

* * * * *